US008407154B1

(12) United States Patent
Fallows

(10) Patent No.: US 8,407,154 B1
(45) Date of Patent: Mar. 26, 2013

(54) PREDICTING SHIPMENT ORIGIN POINTS

(75) Inventor: Thomas Mackenzie Fallows, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/458,470

(22) Filed: Apr. 27, 2012

(51) Int. Cl.
*G06Q 30/00* (2006.01)
(52) U.S. Cl. .................... 705/341; 705/26.41; 705/26.9; 705/333
(58) Field of Classification Search ............... 705/26.41, 705/26.9, 333, 341
See application file for complete search history.

(56) References Cited

U.S. PATENT DOCUMENTS

| | | | |
|---|---|---|---|
| 6,141,653 A | 10/2000 | Conklin et al. | |
| 6,260,024 B1 | 7/2001 | Shkedy | |
| 6,754,636 B1 | 6/2004 | Walker et al. | |
| 2002/0178074 A1 | 11/2002 | Bloom | |
| 2003/0135432 A1* | 7/2003 | McIntyre et al. | 705/28 |
| 2006/0224398 A1* | 10/2006 | Lakshman et al. | 705/1 |
| 2007/0174144 A1* | 7/2007 | Borders et al. | 705/27 |
| 2007/0255606 A1 | 11/2007 | Huang et al. | |
| 2008/0270209 A1 | 10/2008 | Mauseth et al. | |
| 2009/0164338 A1 | 6/2009 | Rothman | |
| 2010/0114776 A1 | 5/2010 | Weller et al. | |
| 2010/0274609 A1* | 10/2010 | Shoemaker et al. | 705/8 |
| 2011/0137747 A1 | 6/2011 | Sapin Bodeman | |

OTHER PUBLICATIONS buySAFE, Inc., "Just in Time for the Holidays: buySAFE and the Hartford Launce First Bonding Service to Protect Consumers from Online Shopping Risks," Press Release, Nov. 17, 2003, 3 pages, [online] [retrieved on Apr. 20, 2012] Retrieved from the Internet <URL:http://www.buysafe.com/about_us/press/press_releases/11_17_03.html>.
buySAFE, Inc., "buySAFE Introduces Referral Program for Online Auction Protection Service," Press Release, Dec. 16, 2003, 2 pages, [online] [retrieved on Apr. 20, 2012] Retrieved from the Internet <URL:http://www.buysafe.com/about_us/press/press_releases/12_15_03.html>.
buySAFE, Inc., "buySAFE Solves Retail Websites' Number One Problem: Gaining Buyer Confidence," Press Release, Jun. 1, 2006, 3 pages, [online] [retrieved on Apr. 20, 2012] Retrieved from the Internet <URL:http://www.buysafe.com/about_us/press/press_releases/06_01_06.html>.
Ebay, Inc., "eBay Buyer Protection," 1995-2011, 7 Pages, [online] [Archived on web.archive.org on May 1, 2011] [Retrieved on Dec. 29, 2011] Retrieved from the internet <URL:http://web.archive.org/web/20110501062428/http://pages.ebay.com/help/policies/buyer-protection.html>.

(Continued)

*Primary Examiner* — Kevin Flynn
(74) *Attorney, Agent, or Firm* — Fenwick & West LLP

(57) ABSTRACT

A shipment origin location for a product purchased by a customer is predicted. A merchant evaluator receives information from a user about a purchase transaction completed by the user with a merchant for a product, including the user's location. When the product is shipped, the merchant evaluator receives tracking information about the shipment. The merchant evaluator determines from the tracking information a point of origin for the shipment and updates its records to reflect the shipment origin point for that merchant and product, given the user's location. As the merchant evaluator compiles similar data for many products shipped by many merchants to many destinations, the merchant evaluator develops a searchable index, enabling a prediction to be made about a shipment origin point for a particular product from a particular merchant, given the location of the user ordering the product. A time-in-transit prediction can also be made.

20 Claims, 2 Drawing Sheets

OTHER PUBLICATIONS

Ebay, Inc., "eBay Buyer Protection," 1995-2011, 1 page, [online] [Archived on web.archive.org on May 27, 2011] [Retrieved on Dec. 29, 2011] Retrieved from the internet <URL:http://web.archive.org/web/20110527130621/http://pages.ebay.com/coverage/index.html>.

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>, <http://shopatron.ooi.net/checkout1.phtml>; <http://shopatron.ooi.netlcheckout3.phtml?multi=>; <http://shopatron.ooi.netlcheckout4.phtml>.

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

* cited by examiner

PREDICTING SHIPMENT ORIGIN POINTS

BACKGROUND

1. Field

Described embodiments concern using shipment origin predictions to improve a customer shopping experience. In particular, described embodiments are directed to gathering and analyzing historical shipping data relating to online merchants for the purpose of predicting the origin location for shipments to customers by online merchants.

2. Description of the Related Art

Online shopping is a popular form of commerce, and customers often have many choices in selecting a merchant from which to buy a particular product. One factor important to customers in choosing a merchant is the transit time required to receive the product once the merchant gives it to the shipper. While some merchants offer customers an option to pay a premium in exchange for a guaranteed shipment time, e.g., overnight or second-day delivery, in the absence of this option the shipment time is largely influenced by the location from which the article is shipped and its destination.

For example, if a customer lives in Los Angeles, a shipment via standard ground delivery service from a warehouse in Las Vegas, Nev. may arrive in one day, while a shipment from a warehouse in Charlotte, N.C. to the same customer may take five days to arrive.

SUMMARY

Described embodiments enable predictions to be made about a shipment origin location for a particular combination of merchant, product, and customer. A merchant evaluator receives information about a purchase transaction completed between the user and a merchant for a product, including the user's location. In various embodiments, the merchant evaluator receives information about the transaction from the customer, merchant, or both. When the product is shipped, the merchant evaluator receives tracking information about the shipment, from either the merchant, the shipment carrier, or the user. The merchant evaluator determines from the tracking information a point of origin for the shipment. The merchant evaluator then updates its records to reflect the shipment origin point for that merchant and product, given the user's location. As the merchant evaluator compiles similar data for many products shipped by many merchants to many destinations, the merchant evaluator develops a searchable index, enabling a prediction to be made about a shipment origin point for a particular product from a particular merchant, given the location of the user ordering the product.

Once the likely shipment origin location is known, a time-in-transit prediction can also be made, thus enabling a determination about when the product is likely to reach the customer. A merchant evaluator can provide this information to a user while the user is browsing one or more shopping sites, thus affording the customer a greater sense of certainty about a particular merchant, and allowing the customer to make a more informed selection from among multiple merchants, with a view in mind to when a purchased item is likely to arrive.

The figures depict embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
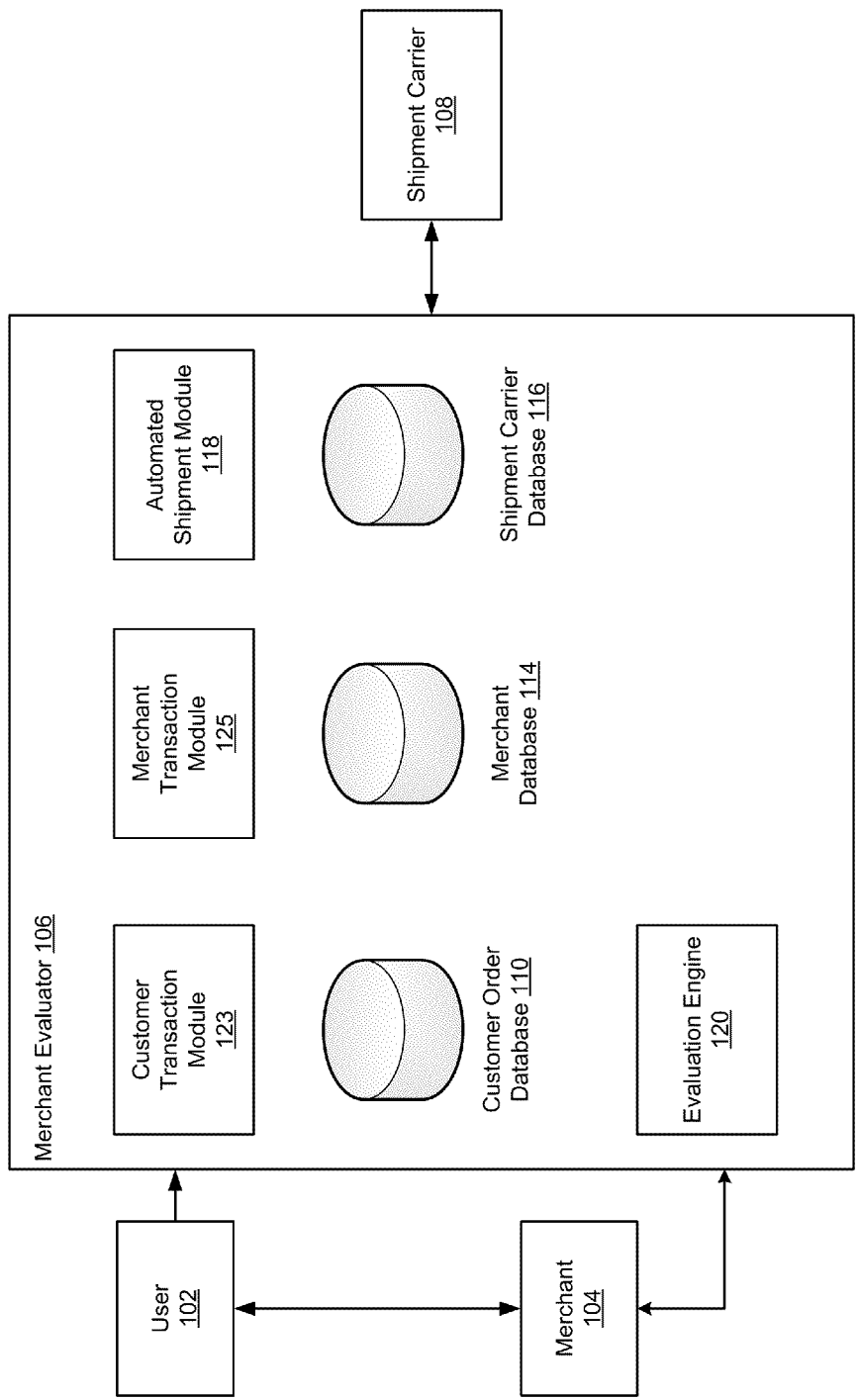
FIG. 1 is an illustration of a system for evaluating the trustworthiness of online merchants in accordance with one embodiment.

FIG. 1 is a block diagram of a merchant evaluator system for evaluating the trustworthiness of online merchants in accordance with one embodiment. Merchant evaluator 106 includes several databases and modules, including customer order database 110, merchant database 114, shipment carrier database 116, automated shipment module 118, evaluation engine 120, customer transaction module 123, merchant transaction module 125, and complaint tracking module 127. Each of these is described further below. FIG. 1 also includes user computer 102, merchant 104, and shipment carrier (or simply "carrier") 108. Although for clarity only one user computer 102, merchant 104, and shipment carrier 108 are illustrated, large numbers of each may be present in various embodiments.

User computer 102 is used by a customer who engages in an electronic commerce transaction, such as a purchase of a good or service. User computer 102 can be a laptop, desktop, cell phone, handheld device, thin or thick client device, video appliance, or any other appropriate computing platform, and transactions may be made using the Internet, cellular network, or any other suitable communications network. The user operating user computer 102 can be an individual, group of individuals, corporate entity, or automated computer system.

Merchant 104 is an individual, group of individuals, corporate entity, or automated computer system that provides goods or services for purchase through electronic commerce transactions, for example using a web site.

For ease of description, we refer generally to a "user", and those of skill will recognize that this includes either the user (customer) herself, the user's computer system, or the combination of the two, as may be appropriate in context. We make similar use of the term "merchant".

Merchant evaluator 106 is an automated computer system administered by an individual, group of individuals, corporate entity, or automated computer system that collects order data and shipment data in connection with the purchase described above in order to identify and predict shipment points of origin. One example of a merchant evaluator 106 provider is Google Inc., of Mountain View, Calif. Using the collected information, merchant evaluator 106 determines the most likely shipment point of origin for a particular product from a particular merchant, and provides this information to users to help the users decide from which merchant to purchase a product.

Merchant evaluator 106 obtains information about a customer transaction with a merchant by receiving transaction details. A user 102 visits a merchant 104 and purchases a product from that merchant. In one embodiment, the user 102 navigates directly to the merchant's web page, for example by entering the merchant's URL into the user's browser, or by searching for the merchant using a search engine. In an alternative embodiment, the user 102 accesses a shopping engine, which in turn refers the user to the merchant 104.

In one embodiment, when user 102 completes a purchase transaction with merchant 104, user 102 communicates information about the transaction to customer transaction module 123 of merchant evaluator 106. In one embodiment, this information includes the Internet protocol (IP) address of user 102, order indicia such as an order number generated by merchant 104, indicia of the product or products ordered, and estimated shipping date provided to user 102 by the merchant 104. In one embodiment, this information is provided by merchant 104 to user 102 through the use of a conversion pixel, or beacon, embedded into the order confirmation page displayed by merchant 104 to user 102. The conversion pixel then causes the user's browser to convey the transaction information to customer transaction module 123, which stores the received information in customer order database 110. In an alternative embodiment, the user 102 supplies the information to customer transaction module 123 by performing an additional step, such as forwarding a confirmation e-mail received from the merchant 104 to the merchant evaluator 106, which then extracts the order details from the email. Alternatively, the user enters information about the order on the merchant evaluator's web site.

Customer transaction module 123 also determines a location of the user 102. In one embodiment, the user's computer supports location services, and the user's browser provides the user's location to customer transaction module 123 along with details of the order. In an alternative embodiment, the user's location can be determined from the user's IP address, using known geolocation techniques or from registries such as the American Registry for Internet Numbers (ARIN). In an alternative embodiment, the user's location is determined directly from the transaction information itself, for example if the delivery address is specified in the provided information. In other embodiments, the user is identified, e.g., by a cookie, and previously obtained address information is used. Once the user's location is identified, customer transaction module 123 stores the location along with the customer order in customer order database 110.

Merchants 104 provide shipment information to merchant transaction module 125, either in real time or in periodic batches. Since there is generally a delay between when a transaction is made and when a shipment is tendered to shipment carrier 108, the order information is typically received from user 102 hours, days, or weeks prior to the shipment information being received for that order from merchant 104. In one embodiment, shipment information received from merchant 104 includes an order number, shipment carrier identification, and the shipment carrier's tracking number. In some embodiments, shipment information also includes delivery information such as a complete delivery address, shipping service level (such as ground or next-day air), or alternatively an approximate delivery location such as city and state, postal code, etc., and shipment weight. Merchant transaction module 125 stores the received shipment information in merchant database 114. In an alternative embodiment, the shipment information is received from shipment carrier 108 rather than merchant 104. In another embodiment, the shipment information is provided to the user 102, who in turn provides it to merchant evaluator 106, e.g., by forwarding an e-mail, or through a beacon in a notification e-mail sent from merchant 104 to customer 102.

Tracking numbers are identifiers generated by shipment carriers for each shipment handled by the carrier. Tracking numbers are typically provided by the carrier 108 to the sender of the shipment—in this case, the merchant, and merchants often forward tracking numbers to purchasers so that they can observe the progress of individual packages handled by shipment carrier 108. Automated shipment module 118 accesses tracking information provided by shipment carrier 108 to identify shipment origin locations as described further below. In one embodiment, shipment carrier 108 provides an API or other mechanism through which shipment module 118 obtains the tracking information. In one embodiment, shipment carrier 108 provides periodic status reports for each tracking number of interest to merchant transaction module 125. In one embodiment, after merchant transaction module 125 receives a tracking number from merchant 104, automated shipment module 118 begins querying shipment carrier 108 for shipment information associated with the tracking number. Merchant evaluator 106 automatically collects data related to that tracking number from shipment carrier 108 and stores it in shipment carrier database 116.

Once merchant transaction module 125 receives a set of tracking numbers and associated order numbers, evaluation engine 120 cross-references each order number received from the merchant with the order numbers stored in customer order database 110 and identifies the record for the order that has been shipped. Automated shipment module 118 then obtains shipment data from carrier 108 using the tracking number received from merchant 104.

The shipment data, or tracking information, obtained from carrier 108 by automated shipment module 118 may vary in alternative embodiments, but includes at least an indication of the shipment's point of origin. In some embodiments, an actual shipping address including a street address and city are specified as the point of origin. In various other embodiments, only a postal code, or a city and state, or simply the state itself is identified in the tracking information as the point of origin.

Merchant transaction module 125 uses the point of origin information obtained by automated shipment module 118 to create or update a product shipment information record for merchant 104 and stores the updated or created record in merchant database 114. In one embodiment, each record is specific to the product identified in the customer order record for the order being shipped. The product shipment information record includes the point of origin information and the destination location for each shipment of that product by that merchant. For example, a product shipment information record my appear as follows in one embodiment:

| Date | Destination | Origin |
| --- | --- | --- |
| 5 Jan. 2012 | Alexandria, VA | Orlando, FL |
| 6 Jan. 2012 | Boston, MA | Orlando, FL |
| 6 Jan. 2012 | San Francisco, CA | Las Vegas, NV |
| 7 Jan. 2012 | Seattle, WA | Las Vegas, NV |
| 7 Jan. 2012 | Chicago, IL | Orlando, FL |

Additional information may be included in the record, such as an order number, shipment carrier, and other data of use to the implementer. In the above example, the merchant ships this particular product from one of two warehouse locations: Orlando, Fla. and Las Vegas, Nev. During the illustrated three-day period, shipments to the Midwest and East Coast of the United States originated from the Orlando warehouse, while shipments to California and Washington State originated from the Las Vegas warehouse.

Once the product shipment information record has been updated (or created, if it did not previously exist), it is again stored in merchant database 114.

Figure 2:
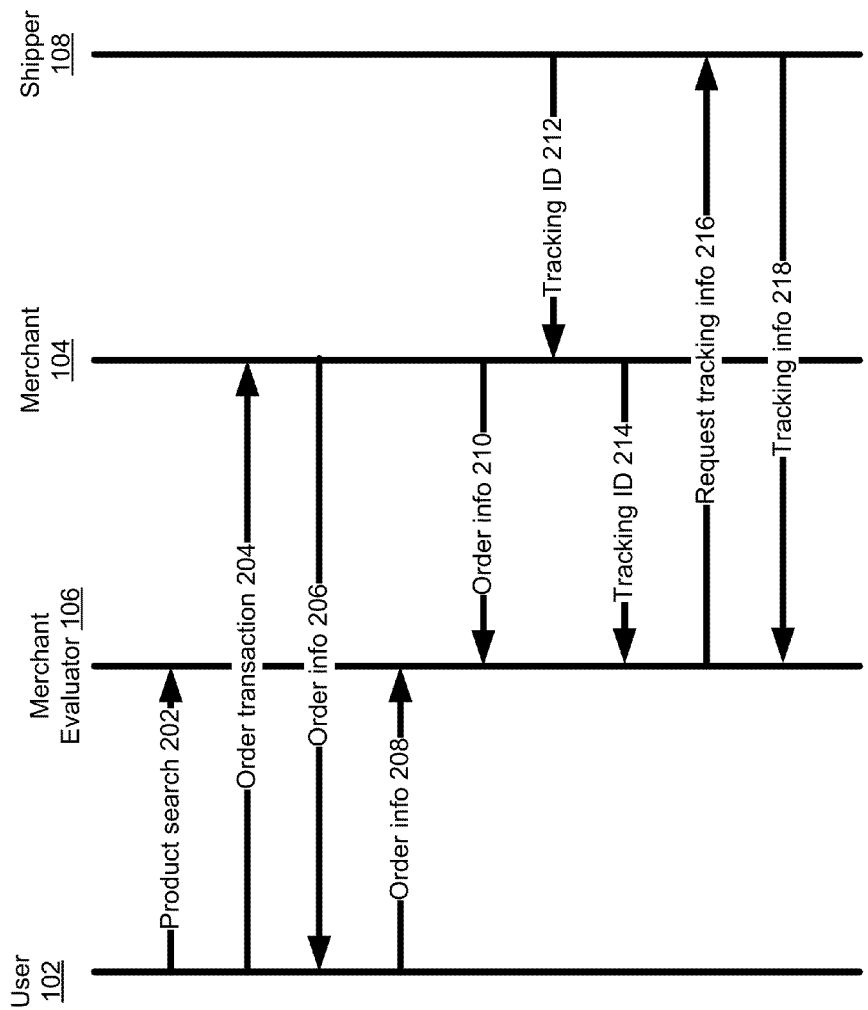
FIG. 2 is an interaction diagram illustrating the interaction between a user, merchant evaluator, merchant and shipment carrier in accordance with one embodiment.

FIG. 2 is an interaction diagram illustrating interactions between a user 102, merchant evaluator 106, merchant 104, and shipment carrier 108 in accordance with one embodiment. In one embodiment in which merchant evaluator 106 also serves as a shopping aggregator site, user 102 begins by performing 202 a product search using merchant evaluator 106. This provides the user 102 with a list of products and different merchants 104 from which each product can be purchased. In alternative embodiments, user 102 proceeds directly to contact merchant 104, e.g., by entering the merchant's URL into a web page on the user's browser client or by following a link to the merchant from a search engine or other site. Regardless, user 102 then proceeds to place 204 an order for a product from merchant 104. Merchant 104 transmits 206 order information, for example as an order confirmation page, back to user 102, and user 102 provides 208 at least a subset of the order information to merchant evaluator 206 as described above. Merchant 104 also transmits 210 at least a portion of the order information to merchant evaluator 106. After merchant 104 receives 212 shipment tracking indicia from shipment carrier 108 as illustrated—or, in an alternative embodiment, from the customer—merchant 104 provides 214 the tracking information to merchant evaluator 106. Merchant evaluator 106 uses the tracking information to request 216 and obtain 218 tracking information from the shipment carrier 108, including the shipment origin point for the package, and then updates the product shipment information record for that product and that merchant.

In one embodiment, merchant evaluator 106 tracks point of origin location data for a merchant at the product brand level, as well as at the more granular product level. Where product shipment information records across a single brand indicate a common point of origin location for a merchant, merchant evaluator 106 infers that a likely point of origin location for a product of the same brand but for which little or no previous shipment data exists will nonetheless be shipped from the same origin location as other products of that brand, given the same destination. For example, if product shipment information records for merchant Sahara Services indicates that multiple products manufactured by Acme Brands are shipped to Los Angeles from a point of origin location of Phoenix, Ariz., merchant evaluator 106 infers that additional Acme products shipped by Sahara to Los Angeles will also originate in Phoenix.

In some embodiments, if few or no product shipment information records exist for a particular product, merchant and destination city combination, merchant evaluator 106 makes a prediction about point of origin locations based on existing records having nearby destination cities, if available, or having a same or nearby state or region.

While many merchants ship product from their own warehouses, some merchants arrange for drop shipments of products to consumers. When a drop shipment takes place, the product is shipped directly by a manufacturer or wholesaler to the customer, rather than from the merchant's own inventory. In one embodiment, if a merchant 104 is known to use drop shipments for one or more products, a product shipment information record for those products from that merchant in merchant database 114 includes a reference to a product shipment information record for the products as shipped from the manufacturer or wholesaler. For example, if Tom's Teas Co. is known to use drop shipping to fulfill customer orders for novelty tea mugs manufactured by Streets of San Francisco Inc., the product shipment information record for orders placed by customers of Tom's Teas Co. is updated to include an additional reference to the fact that the item was drop shipped. Similar references to drop shipping are also made to the product shipment information records of other merchants who also drop ship the same product. In this manner, even if no previous order information is known for another of the merchants who drop ships the product, merchant evaluator 106 can still infer shipment origin location based on the referenced product shipment information record for any merchant who is known to drop ship an item.

Once data points are collected for point of origin locations for product shipments, a prediction or inference can be made about a likely origin location given a particular purchaser of a particular product from a particular merchant.

In the context of a shopping aggregation site, which displays a list of merchants from whom a particular product is available, the site can indicate to a user 102 next to some or all merchants a location from which the product is expected to ship. In some embodiments, an estimated time in transit can be provided. For example, shipment carrier 108 may publish or otherwise make available to merchant evaluator 106 an estimated transit time between city pairs, state pairs, or region pairs, and merchant evaluator 106 displays a transit time based on that information. For example, if user 102 is in Boston, Mass. and the point of origin shipment location is Orlando, Fla., the predicted transit time might be three days. A different user 102 viewing the same site from Los Angeles may be shown an estimated transit time of one day, based on a prediction that the product will be shipped from a Las Vegas, Nev. point of origin. In some embodiments, merchant evaluator 106 may itself be the online shopping aggregation site. In alternative embodiments, merchant evaluator 106 receives information about a user's location (either directly from the user or indirectly from a third party) and makes transit times available in response, either for free, or in alternative embodiments, for a fee.

In various embodiments, merchants 104 display a predicted origin location and/or an estimated shipment date to users 102 as part of the product advertisement or transaction process. Merchants 104 or merchant evaluator 106 also display a time in transit to users 102 based on the user's location and the likely point of origin for a shipment to that location. In various embodiments, the estimated lead time and time in transit are combined to provide a user with an estimated delivery date to the user's location.

In some embodiments, merchant evaluator 106 or merchant 104 guarantees a delivery date to a user 102. For example, if the user's location is known with a threshold level of certainty, based on the user's IP address or other geolocating technique, and if the point of origin for the merchant and the product is also known with a threshold level of certainty, for example based on a large volume of data points for shipments of that product by that merchant to that location, a guarantee can be offered to the user 102 that the product will be received by a date that takes into account the estimated time between order and shipment combined with the estimated time in transit for the origin and destination location. The particular confidence thresholds that must be met before the guarantee is offered are left to the discretion of the implementer, and can be selected based on a particular degree of risk deemed to be acceptable.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of automated shipment module 118, evaluation engine 120, and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "collecting" or "evaluating" or "determining" or the like, refer to the action and processes of a computer system, or similar electronic com puting device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for determining a shipment origin location for a product shipped by a merchant, the method comprising:
   for each of a plurality of purchase transactions for the product between the merchant and customers:
      receiving transaction information including identification of the product, the merchant, and the customer;
      determining a location of the customer;
      receiving shipping information associated with the product, the shipping information including a shipment origin location;
      storing an historical record indicating, for the customer's location, the merchant and the product, the shipment origin location;
   receiving a request for a predicted shipment origin location, the request including identification of the merchant and the product, and a location of a prospective customer;
   identifying, by a computer, based on the prospective customer's location and at least one historical record indicating a previous shipment of the product from the merchant to the prospective customer's location, a predicted shipment origin location; and
   providing, by the computer, in response to the received request, the predicted shipment origin location.

2. The method of claim 1 wherein the transaction information is received from the customer.

3. The method of claim 2 wherein the customer receives the transaction information and a conversion pixel from the merchant, and the transaction information is received from the customer pursuant to instructions present in the conversion pixel.

4. The method of claim 1 wherein the transaction information is received from the merchant.

5. The method of claim 1 wherein the customer's location is received from the customer.

6. The method of claim 5 wherein the transaction information is received from the merchant.

7. The method of claim 1 wherein the customer's location is determined according to the customer's network address.

8. The method of claim 1 wherein the shipping information is received from the merchant.

9. The method of claim 1 wherein receiving shipping information further comprises:
   receiving shipment tracking information from the merchant, the tracking information including identification of a shipment carrier;
   requesting information including a point of origin for the shipment from the shipment carrier; and
   receiving from the shipment carrier information about the shipment, including the shipment origin location.

10. The method of claim 1 further comprising providing an estimated shipment delivery date for the prospective customer.

11. A computer program product for determining a shipment origin location for a product shipped by a merchant, the computer program product stored on a non-transitory computer-readable medium and including program code configured to cause a processor to carry out the steps of:
    for each of a plurality of purchase transactions for the product between the merchant and customers:
        receiving transaction information including identification of the product, the merchant, and the customer;
        determining a location of the customer;
        receiving shipping information associated with the product, the shipping information including a shipment origin location;
        storing an historical record indicating, for the customer's location, the merchant and the product, the shipment origin location;
    receiving a request for a predicted shipment origin location, the request including identification of the merchant and the product, and a location of a prospective customer;
    identifying using the stored historical records indicating at least one previous shipment of the product from the merchant to the prospective customer's location, a predicted shipment origin location; and
    providing, in response to the received request, the predicted shipment origin location.

12. The computer program product of claim 11 wherein the transaction information is received from the customer.

13. The computer program product of claim 12 wherein the customer receives the transaction information and a conversion pixel from the merchant, and the transaction information is received from the customer pursuant to instructions present in the conversion pixel.

14. The computer program product of claim 11 wherein the transaction information is received from the merchant.

15. The computer program product of claim 11 wherein the customer's location is received from the customer.

16. The computer program product of claim 15 wherein the transaction information is received from the merchant.

17. The computer program product of claim 11 wherein the shipping information is received from the merchant.

18. The computer program product of claim 11 wherein receiving shipping information further comprises:
    receiving shipment tracking information from the merchant, the tracking information including identification of a shipment carrier;
    requesting information including a point of origin for the shipment from the shipment carrier; and
    receiving from the shipment carrier information about the shipment, including the shipment origin location.

19. The computer program product of claim 11 further comprising providing an estimated shipment delivery date for the prospective customer.

20. A system for determining a shipment origin location for a product shipped by a merchant, the system comprising:
    a processor;
    a customer transaction module, executed by the processor, adapted to receive transaction information for each of a plurality of purchase transactions for a product between a merchant and customers, the transaction information including identification of the product, the merchant, and the customer, and to identify a location of the customer;
    a merchant database, coupled to the processor, for storing product shipment information records; and
    a merchant transaction module, executed by the processor, adapted to:
        receive, for each of the plurality of purchase transactions for the product between the merchant and customers, shipping information associated with the product, the shipping information including a shipment origin location;
        store in the merchant database a product shipment information historical record indicating, for the customer's location, the merchant and the product, the shipment origin location;
        receive a request for a predicted shipment origin location, the request including identification of the merchant and the product and a location of a prospective customer;
        identify, using the product shipment information historical records stored in the merchant database including at least one previous shipment of the product from the merchant to the prospective customer's location, a predicted shipment origin location; and to
    provide, in response to the received request, the predicted shipment origin location.

\* \* \* \* \*